United States Patent [19]

Waggoner

[11] 3,959,539

[45] May 25, 1976

[54] COATING MATERIAL OF POLYMERS AND SALTS OF FATTY ACIDS

[75] Inventor: Marion Glen Waggoner, Parkersburg, W. Va.

[73] Assignee: E. I. Du Pont de Nemours and Company, Wilmington, Del.

[22] Filed: Nov. 13, 1974

[21] Appl. No.: 523,477

Related U.S. Application Data

[63] Continuation-in-part of Ser. No. 419,891, Nov. 28, 1973, abandoned.

[52] U.S. Cl. .............................. 428/35; 260/23 AK; 428/441; 526/5; 526/14; 526/16; 526/240; 526/324
[51] Int. Cl.² ........................................ C08L 91/00
[58] Field of Search ......... 260/23 AR, 78.5 R, 80.8, 260/23 H; 428/35

[56] References Cited

UNITED STATES PATENTS

| 3,196,134 | 7/1965 | Donat | 266/78.5 |
| 3,264,272 | 8/1966 | Reas | 260/78.5 |
| 3,267,083 | 8/1966 | Imhof | 260/80.5 |

*Primary Examiner*—Donald E. Czaja
*Assistant Examiner*—William E. Parker

[57] ABSTRACT

Powder coating materials which consist essentially of an ionic copolymer, or a copolymer or terpolymer base resin of the ionic copolymer, and 1 to 20% by weight, based on the weight of copolymer, of a monobasic fatty acid of 10 to 22 carbon atoms, a metal salt of a monobasic fatty acid of 10 to 22 carbon atoms, or mixtures thereof. The materials are useful for coating glass bottles.

21 Claims, No Drawings

COATING MATERIAL OF POLYMERS AND SALTS OF FATTY ACIDS

CROSS-REFERENCE TO RELATED APPLICATION

This application is a continuation-in-part of application Ser. No. 419,891, filed Nov. 28, 1973, now abandoned.

BACKGROUND OF THE INVENTION

1. Field of the Invention

This invention relates to powder coating materials and particularly to such materials prepared from ionic copolymers or copolymers or terpolymer base resin thereof and monobasic fatty acids or metallic salts of monobasic fatty acids.

2. Description of the Prior Art

Ionic copolymer coatings show good adhesion to many substrates, including glass. Such ionic copolymer coatings fused on glass bottles, such as nonreturnable beverage bottles, show initial adhesion to the glass which generally exceeds the ultimate tensile strength of the coatings. Due to absorption of water by the coating upon aging it has been found that the adhesion of the coating decreases. In fact, it may take as long as three weeks or more before a level of decreased adhesion is reached whereby the coating becomes peelable (ultimate tensile strength of the polymer exceeds the adhesion). Ionomeric copolymers also are notch sensitive materials. Therefore, cracks in the glass, when broken, propagate into the coating, greatly decreasing the fragment retaining ability of the plastic coating which is referred to as cullet retention. It is desirable to achieve controlled reduction in adhesion in a period of 24 to 48 hours or less and thereby obtain maximum cullet retention of the glass. Metallic salts of stearic and oleic acids are known release agent additives in polyolefin resins, e.g., for chill roll release in extrusion coating and for slip and anti-block in blown film. These additives are generally incorporated into the polymer by melt blending whereby the plastic pellets used to make coatings contain the additive dispersed or blended uniformly throughout the polymer.

SUMMARY OF THE INVENTION

It has now been found that coatings on glass which achieve maximum cullet retention in 24 to 48 hours are obtained by using a powder coating material which consists essentially of a copolymer of α-olefins of the formula R-CH=CH$_2$, where R is a radical selected from the class consisting of hydrogen and alkyl radicals having from 1 to 8 carbon atoms, and α,β-ethylenically unsaturated carboxylic acids having from 3 to 8 carbon atoms, said copolymer having from 0% to 90% of the carboxylic acid groups ionized by neutralization with metal ions, said copolymer being a copolymer of the α-olefins and the unsaturated carboxylic acid in which the carboxylic acid groups are randomly distributed over all molecules and in which (1) the α-olefin content of the copolymer is at least 50 mol percent, based on the α-olefin-acid copolymer, (2) the unsaturated carboxylic acid content of the copolymer is from 0.2 to 25 mol percent, based on the α-olefin-acid copolymer, and (3) any other monomer component optionally copolymerized in said copolymer is monoethylenically unsaturated, and said metal ions having an ionized valence of from one to three inclusive when the unsaturated acid is a monocarboxylic acid and an ionized valence of one when the unsaturated acid is a dicarboxylic acid and said metal ions being selected from the group consisting of uncomplexed and complexed metal ions, and 1 to 20% by weight, based on the weight of the copolymer of an additive selected from the class consisting of monobasic fatty acids of 10 to 22 carbon atoms, metal salts of monobasic fatty acids of 10 to 22 carbon atoms, and mixtures thereof.

Preferred results are obtained when the copolymer is an ionic copolymer having from 10 to 90% by weight of the carboxylic acid groups ionized by neutralization with metal ions, preferably $Na^+$ and $Zn^{+2}$ ions.

DETAILED DESCRIPTION OF THE INVENTION

The powder coating material consists essentially of an ionic copolymer or a copolymer or terpolymer base resin of the ionic copolymer and either at least one monobasic fatty acid of 10 to 22 carbon atoms, metallic salts of said fatty acids or mixtures thereof. The term "consisting essentially of" as used herein, is meant to include in the coating material only those additional components which do not materially affect the essential characteristics of the coating material as it relates to this invention. In other words, this term excludes unspecified components in amounts which prevent the advantages of the coating materials of this invention from being realized.

Suitable polymers are described in U.S. Pat. No. 3,264,272 and Canadian Pat. No. 655,298, the disclosures of which are incorporated by reference. The polymers are in the form of particles which form 100 mesh or finer powder. Preferably the particles which make up the powder are in the form of spherical-shaped particles having an average diameter of 10 to 100 microns and are characterized by having a surface that is rough and is covered with hemispherical bumps about 0.1 micron in diameter. The unique, spherical-shaped particles can be prepared by a method described in Assignee's Gebhard, Waggoner and Webster application, U.S. Ser. No. 419,894 filed Nov. 28, 1973.

Illustrative of polymers are ionic copolymers of α-olefins of the formula R—CH=CH$_2$, where R is hydrogen or an alkyl radical of 1 to 8 carbon atoms, α,β-ethylenically unsaturated carboxylic acids having from 3 to 8 carbon atoms, and optionally, a monoethylenically unsaturated monomer. Suitable olefins include ethylene, propylene, butene-1, pentene-1, hexene-1, heptene-1, 3-methylbutene-1, 4-methylpentene-1, etc. Ethylene is the preferred olefin. Although polymers of olefins having higher carbon numbers can be employed in the present invention, they are not materials which are readily obtained or available. The concentration of the α-olefin is at least 50 mol percent in the copolymer and is preferably greater than 80 mol percent. Examples of α,β-ethylenically unsaturated carboxylic acids are acrylic acid, methacrylic acid, ethacrylic acid, itaconic acid, maleic acid, fumaric acid, monoesters of said dicarboxylic acids, such as methyl hydrogen maleate, methyl hydrogen fumarate, ethyl hydrogen fumarate and maleic anhydride. Although maleic anhydride is not a carboxylic acid in that it has no hydrogen attached to the carboxyl groups, it can be considered an acid for the purposes of the present invention because of its chemical reactivity being that of an acid. Similarly, other α,β-monoethylenically unsaturated anhydrides of carboxylic acids can be employed. The preferred unsaturated carboxylic acids are methacrylic and acrylic acids. As indicated, the concentration of acidic monomer in the copolymer is from 0.2 mol percent to 25 mol percent, and, preferably, from 1 to 10 mol percent.

The copolymer base need not necessarily comprise a two component polymer. Thus, although the olefin content of the copolymer should be at least 50 mol percent, more than one olefin can be employed to provide the hydrocarbon nature of the copolymer base. Additionally, other copolymerizable monoethylenically unsaturated monomers, illustrative members of which are mentioned below in this paragraph, can be employed in combination with the olefin and the carboxylic acid comonomer. The scope of base copolymers suitable for use in the present invention is illustrated by the following two-component examples: Ethylene/acrylic acid copolymers, ethylene/methacrylic acid copolymers, ethylene/itaconic acid copolymers, ethylene/methyl hydrogen maleate copolymers, ethylene/maleic acid copolymers, etc. Examples of tricomponent copolymers include: Ethylene/acrylic acid/methyl methacrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, and ethylene/chlorotrifluoroethylene/methacrylic acid copolymers.

In addition to the third components of the ionic copolymer stated above, additional third monomeric components can be an alkyl ester of an $\alpha,\beta$-ethylenically unsaturated carboxylic acid of 3 to 8 carbon atoms where the alkyl radical has 4 to 18 carbon atoms. Particularly preferred are the terpolymers obtained from the copolymerization of ethylene, methacrylic acid, and alkyl esters of methacrylic acid or acrylic acid with butanol. The concentration of this optional component is 0.2 to 25 mol percent, based on the weight of copolymer, preferably from 1 to 10 mol percent. Representative examples of the third component include n-butyl acrylate, isobutyl acrylate, secondary butyl acrylate, tertiary butyl acrylate, n-butyl methacrylate, isobutyl methacrylate, sec-butyl methacrylate, t-butyl methacrylate, n-pentyl acrylate, n-pentyl methacrylate, isopentyl acrylate, isopentyl methacrylate, n-hexyl acrylate, n-hexyl methacrylate, 2-ethyl-hexyl acrylate, 2-ethyl-hexyl methacrylate, stearyl acrylate, stearyl methacrylate, n-butyl ethacrylate, 2-ethyl hexyl ethacrylate. Also, the third component includes mono- and di-esters of 4 to 8 carbon atom dicarboxylic acids. Representative examples of these include n-butyl hydrogen maleate, sec-butyl hydrogen maleate, isobutyl hydrogen maleate, t-butyl hydrogen maleate, 2-ethyl hexyl hydrogen maleate, stearyl hydrogen maleate, n-butyl hydrogen fumarate, sec-butyl hydrogen fumarate, isobutyl hydrogen fumarate, t-butyl hydrogen fumarate, 2-ethyl hexyl hydrogen fumarate, stearyl hydrogen fumarate, n-butyl fumarate, sec-butyl fumarate, isobutyl fumarate, t-butyl fumarate, 2-ethyl hexyl fumarate, stearyl fumarate, n-butyl maleate, sec-butyl maleate, isobutyl maleate, t-butyl maleate, 2-ethyl hexyl maleate, stearyl maleate. The preferred alkyl esters contain alkyl groups of 4 to 8 carbon atoms. The most preferred alkyl groups contain 4 carbon atoms. Representative examples of the most preferred esters are n-butyl acrylate, isobutyl acrylate, n-butyl methacrylate, isobutyl methacrylate, tertiary butyl acrylate, tertiary butyl methacrylate.

The copolymers may also, after polymerization but prior to ionic crosslinking, be further modified by various reactions to result in polymer modifications which do not interfere with the ionic crosslinking. Halogenation of an olefin acid copolymer is an example of such polymer modification.

The preferred base copolymers, however, are those obtained by the direct copolymerization of ethylene with a monocarboxylic acid comonomer.

Metal ions which are suitable in forming the ionic copolymers of the present invention can be divided into two categories, uncomplexed metal ions and complexed metal ions. In the uncomplexed metal ions the valence of the ion corresponds to the valence of the metal. These metal ions are obtained from the commonly known and used metal salts. The complexed metal ions are those in which the metal is bonded to more than one type of salt group, at least one of which is ionized and at least one of which is not. Since the formation of the ionic copolymers requires only one ionized valence state, it will be apparent that such complexed metal ions are equally well suited in the present invention. The term "metal ion having one or more ionized valence states" means a metal ion having the general formula $Me^{+n}X_m$, where $n$ is the ionic charge and is at least one, X is a nonionized group and $n+m$ equal the valence of the metal. The utility of complexed metal ions employed in the formation of ionic copolymers corresponds in their ionized valences to those of the uncomplexed metal ions. The monovalent metals are, of course, excluded from the class of complexed metal ions but higher valent metals may be included depending on how many metal valences are complexed and how many can be ionized. The preferred complexed metal ions are those in which all but one metal valences are complexed and one is readily ionized. Such compounds are in particular the mixed salts of very weak acids, such as oleic and stearic acid, with ionizable acids, such as formic and acetic acid.

The uncomplexed metal ions which are suitable in forming the ionic copolymers of the present invention, therefore comprise for the $\alpha$-olefin-monocarboxylic acid copolymers, mono-, di- and trivalent ions of metals in Groups I, II, III, IV-A and VIII of the Periodic Table of Elements (see page 392, Handbook of Chemistry and Physics, Chemical Rubber Publishing Co., 37th ed.). Uncomplexed monovalent metal ions of the metals in the stated groups are also suitable in forming the ionic copolymers of the present invention with copolymers of olefins and ethylenically unsaturated dicarboxylic acids. Suitable monovalent metal ions are $Na^+$, $K^+$, $Li^+$, $Cs^+$, $Ag^+$, $Hg^+$ and $Cu^+$. Suitable divalent metal ions are $Be^{+2}$, $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$, $Ni^{+2}$ and $Zn^{+2}$. Suitable trivalent metal ions are $Al^{+3}$, $Sc^{+3}$, $Fe^{+3}$ and $Y^{+3}$.

The preferred metal ions, regardless of the nature of the base copolymer are $Na^+$ and $Zn^{+2}$. These metals are preferred because they result in ionic copolymers having the best combination of improvement in solid state properties with retention of melt fabricability. It is not essential that only one metal ion be employed in the formation of the ionic copolymers and more than one metal ion may be preferred in certain applications.

The melt index of the polymer ranges from 0.1 g./10 minutes to 500 g./10 minutes, preferably 4 to 50 g./10 minutes.

Useful as additives are monobasic fatty acids include those having 10 to 22 carbon atoms, e.g., capric ($C_{10}$), lauric ($C_{12}$), myristic ($C_{14}$), palmitic ($C_{16}$), stearic ($C_{18}$), arachidic ($C_{20}$), behenic ($C_{22}$); oleic (18); linoleic ($C_{18}$), etc. Useful metal salts include salts of said aforementioned fatty acids, e.g., sodium, potassium, lithium, zinc, calcium and magnesium salts. Also useful are mixtures of said fatty acids, e.g., arachidic and behenic acids; mixtures of said salts of fatty acids, e.g., sodium stearate and sodium palmitate; and mixtures of said fatty acids and said salts of fatty acids. The fatty acids or salts are combined with the copolymer in an amount of 1 to 20% by weight, preferably 2 to 5% by weight, based on the total weight of the copolymer. The additives and polymers can be mixed together by any mixing device known to those skilled in the art.

The powder coating material is applied to glass surfaces, e.g., bottles, plates, etc., by dry spraying followed by fusing with heat such as infrared or other heating source. The coatings are generally in the range of 3 to 10 mils, preferably 4 to 6 mils. The coatings of this invention retain indefinitely, after 24 to 48 hours conditioning, approximately 90 to 100% by weight of the glass particles when the glass is broken.

The powder coating materials, as indicated previously, are useful in coating surfaces, particularly glass. The coatings containing the additives significantly decrease the aging time required for the coatings to achieve the best cullet retention of glass from two to three weeks to about 48 hours or less. The result is that it will be possible for bottlers to reduce inventory and to reduce the warehousing problems associated with aging coated glass bottles.

EXAMPLES OF THE INVENTION

The following Examples further illustrate the invention. All percentages are by weight unless otherwise indicated. The drop test used in the examples was performed as follows: The coated bottles were filled with dilute $H_2SO_4$, gelatin capsules containing sodium carbonate were added, and the bottles were capped. When the gelatin capsules dissolved, the $H_2SO_4/Na_2CO_3$ reaction generated an internal pressure in the bottles of about 60 psig. The bottles were then dropped 4 feet on their sides (horizontal position) onto a steel plate. The fragments leaving the area immediately beneath the bottle were weighed and subtracted from the initial weight of glass in the bottle. The ratio of glass retained in the bottle area to initial glass weight × 100% equals percent cullet retention or percentage of glass retained by the polymer coating.

EXAMPLE 1

Glass microscope slides were sprinkled with an ionic copolymer powder by vibrating over each slide a 100 mesh screen containing a small quantity of powder. The ionic copolymer powder was prepared as described in Example 1 of Assignee's copending U.S. application Ser. No. 419,894, filed Nov. 28, 1973 utilizing 340 ml./min. water, 34 ml./min. 15% solution of $NH_4OH$ and 50 g./min. ethylene/methacrylic acid copolymer base resin containing 11% methacrylic acid (melt index 100) in a continuous process. The base resin was partially neutralized with a 2.5% NaOH solution at 30 ml./min. The ionic copolymer particles had a melt index of 20.4 g./10 minutes as determined by ASTM D-1238, Condition E, and a percent fluidization = packed density/density in fluidized state × 100% of 206% at a fluidizing gas velocity of 1.3 cm./sec. and a packed density of 35 lb./ft.$^3$. The individual particles had on their surface hemispherical shaped bumps about 0.1 micron in diameter at the base. The powder was melted using an infrared heat source to form continuous 4 to 6 mil coatings on the glass. Each coating was allowed to cool to room temperature. After 48 hours aging at 24°C. the coatings had high adhesion to the glass and could not be peeled from the glass without rupturing the polymer coating.

A blended sample of the ionic copolymer was prepared by blending 4.4% sodium oleate, based on the weight of copolymer, with a wet filter cake of an ionic copolymer powder as described above. The blend was dried and was used to prepare coatings as described above. The coatings were aged at 24°C., and it was found that the coatings could be peeled from the glass after 24 hours aging.

EXAMPLE 2

Coatings on glass slides were prepared as described in Example 1 except that 2% zinc stearate was used in place of the sodium oleate and was blended with dry ionic copolymer powder. The coatings could be peeled from the glass after being aged for 48 hours at 24°C. The peel force was estimated to be 1000–1500 g./1 inch of sample width (90° peel angle and about 12 inch/minute peel rate).

EXAMPLE 3

An ionic copolymer powder containing no salt additive prepared as described in the first paragraph of Example 1 was sprayed onto glass beverage bottles and fused by infrared heat to produce clear coatings on the bottle of 4 to 5 mils in thickness. The coating could not be peeled from the glass after greater than 48 hours aging and gave 60–70% retention of the glass fragments during drop tests.

An ionic copolymer powder as described above was dry blended with 7% sodium stearate, sprayed onto glass beverage bottles and fused by heat to produce 4 to 5 mil thick coatings on the glass. After aging for 24 hours the coated bottles were drop tested. 90 to 100 Percent of the glass fragments were retained by the coating. The adhesion to the glass was 800 to 1250 g./inch. The coatings were clear and identical in appearance to the coatings described in the first paragraph of this Example. Similar results were obtained when the amount of sodium stearate in the dry blend was reduced to 3%.

EXAMPLE 4

Example 2 was repeated except that the blended sample consisted of the ionic copolymer and 2% sodium stearate. After aging for 48 hours at 24°C. the coatings were peeled from the glass using a force of about 1000 to 1500 g./inch.

EXAMPLE 5

Example 2 was repeated except that the blended sample consisted of the ionic copolymer and 2% sodium oleate. After aging for 48 hours at 24°C. the coatings were peeled from the glass using a force of about 1000 to 1500 g./inch.

EXAMPLE 6

An ionic copolymer powder was prepared as described in Example 1 utilizing about 660 ml./min. water, 19 ml./min. 25% solution of NH$_4$OH and 50 g./min. ethylene/methacrylic acid copolymer base resin containing 11% methacrylic acid (melt index 100) in a continuous process. During the process a 10% solution of sodium stearate was added to the shear device at 20 ml./min. along with the hot water and ammonia stream. This was equal to 4 grams of sodium stearate per 100 grams of base resin. The powder produced was partially neutralized with a 10% NaOH solution at about 8 ml./min. to a melt index of 20.0 g./10 minutes as determined by ASTM D-1238, Condition E. After filtering and drying, the powder was electrostatically sprayed onto 28 oz. nonreturnable glass beverage bottles and fused by infrared heat to produce 4–5 mil coatings. The bottles were aged at room conditions, and the force necessary to peel 1-inch strips from the bottles after 1 and 2 days were measured. Cullet retention was determined using bottles aged for 2 days. The results are found in Table 1.

EXAMPLE 7

Example 6 was repeated except that a 10% solution of sodium stearate was added at the shear device at 11 ml./min. This was equal to 2.2 grams of sodium stearate per 100 g. of base resin. The powder produced was neutralized to a melt index of 20.8 g./10 min. filtered and dried. Bottles were coated as in Example 6. Peel adhesion and cullet retention values are found in Table 1.

EXAMPLE 8

Example 6 was repeated except that the base resin was mixed with sodium stearate (4 g. of sodium stearate/100 g. of base resin) and then fed to the extruder. The powder produced was neutralized to a melt index of 13.0 g./10 min., filtered and dried. Bottles were coated as in Example 6. Peel adhesion and cullet retention values are found in Table 1.

EXAMPLE 9

Example 8 was repeated except that 2 g. of sodium stearate were used per 100 g. of base resin. The powder produced was neutralized to a melt index of 21.9 g./10 mins., filtered and dried. Bottles were coated as in Example 6. Peel adhesion and cullet retention values are found in Table 1.

EXAMPLE 10

Example 6 was repeated except that a 10% solution of sodium stearate was added to the neutralizing tank at about 15 ml./min. This was equal to 3 g. of sodium stearate/100 g. of base resin. Bottles were coated with the powder as in Example 6. Peel adhesion and cullet retention values are found in Table 1.

EXAMPLE 11

Stearic acid was melt blended into a base resin described in Example 6 at 3 g. of stearic acid/100 g. of base resin. The melt blend was then used in the process described in Example 6. The powder produced was neutralized to a melt index of 17.8 g./10 mins., filtered and dried. Bottles were coated as described in Example 6. Peel adhesion and cullet retention values are found in Table 1.

EXAMPLE 12

Example 11 was repeated except that the stearic acid was melt blended at 4 g. of stearic acid/100 g. of base resin. The powder produced was neutralized to a melt index of 13.6 g./10 min., filtered and dried. Bottles were coated as described in Example 6. Peel adhesion and cullet retention values are found in Table 1.

EXAMPLE 13

Example 6 was repeated except that 10 ml./min. of oleic acid was added at the shear device. This was equivalent to 18 g. of oleic acid/100 g. of base resin. The powder produced was neutralized to a melt index of 16.0 g./10 mins., filtered and dried. Bottles were coated as described in Example 6. Peel adhesion and cullet retention values are found in Table 1.

EXAMPLE 14

Example 13 was repeated except that a 7½% solution of sodium oleate in water was added to the shear device at 33½ ml./min. This was equivalent to 5 g. of sodium oleate/100 g. of base resin. Included with the sodium oleate stream was sufficient Dow Corning FG-10 antifoamer to give a concentration of 80 ppm based on the total slurry rate. The powder produced was neutralized to a melt index of 19 g./10 mins., filtered and dried. Bottles were coated as described in Example 6. Peel adhesion and cullet retention values are found in Table 1.

EXAMPLE 15 (Control)

Example 6 was repeated except that no additive was present. After the base resin was neutralized it was filtered and dried. Bottles were coated as described in Example 6. Peel adhesion was high and did not exhibit low peel adhesion (controlled release); cullet retention was poor as noted in Table 1.

TABLE 1

| Example No. | Additive | Cullet Retention Percent Greater Than | | | Peel Adhesion (gms./inch) | |
|---|---|---|---|---|---|---|
| | | 98 | 95 | 90 | 1 Day | 2 Days |
| 6 | Sodium Stearate | 90 | 90 | 100 | 53 | 75 |
| 7 | Sodium Stearate | 72 | 90 | 100 | — | — |
| 8 | Sodium Stearate | 83 | 87 | 87 | 100 | 100 |
| 9 | Sodium Stearate | 76 | 86 | 86 | 515 | 300 |
| 10 | Sodium Stearate | 61 | 78 | 83 | 100 | 212 |
| 11 | Stearic Acid | 96 | 100 | 100 | 80 | 100 |
| 12 | Stearic Acid | 70 | 88 | 94 | 75 | 170 |
| 13 | Oleic Acid | 72 | 89 | 89 | 150 | 240 |
| 14 | Sodium Oleate | 50 | 63 | 94 | 235 | 150 |

TABLE 1-continued

| Example No. | Additive | Cullet Retention Percent Greater Than | | | Peel Adhesion (gms./inch) | |
|---|---|---|---|---|---|---|
| | | 98 | 95 | 90 | 1 Day | 2 Days |
| 15 (Control) | None | 38 | 38 | 50 | >3,000 | >3,000 |

EXAMPLE 16

Powder prepared according to the procedure of Example 6 except that the powder was unneutralized was placed in a stainless steel beaker as a wet filter cake. Methanol was added to produce a slurry and was heated with agitation to 65°C. Myristic acid (Humko Products' 9014) was added at 5 g. per 100 g. of polymer. Stirring was continued for 15 minutes. The slurry was then evaporated down and dried in a vacuum oven. The dry powder was screened to remove lumps and then used to coat glass microscope slides. The polymer was fused on the slides as a continuous coating of 4 to 5 mils in thickness. The coated slides were aged at 50% RH and room temperature. Peel adhesion of the polymer to the glass was measured. After two days the polymer could be peeled from the slides as indicated in Table 2.

EXAMPLE 17 (Control)

Example 16 was repeated except that no additive was present. Table 2 indicates that after 2 days of aging the polymer could not be peeled from the slides.

TABLE 2

| Example No. | Additive | Additive Percent on Polymer | Peel Adhesion (gms./inch) | | |
|---|---|---|---|---|---|
| | | | 4 Hrs. | 1 day | 2 days |
| 16 | Myristic Acid | 5 | >1500 | about 1600 | 1100 |
| 17 (Control) | None | — | >1500 | >1500 | >1500 |

EXAMPLE 18

Ionic copolymer powder was prepared as described in Example 2 of U.S. Ser. No. 419,894, filed Nov. 28, 1973. Water was added at the rate of 2.2 gal./min., 25% solution of NH$_4$OH was added at the rate of 27.0 ml./min. and ethylene/methacrylic acid copolymer base resin containing 11% methacrylic acid (melt index 100) was added at the rate of 50 g./min. The powder produced was partially neutralized with a 10% NaOH solution at about 12-14 ml./min. to a melt index of 20.7 g./10 minutes as determined by ASTM D-1238, Condition E. After filtering the wet filter cake was slurried in a stainless steel beaker with distilled water at 70°C. with agitation. Five grams of capric acid (Humko Products 9010) was added per 100 g. of base resin. The capric acid was neutralized by the addition of 23 g. of NaOH/100 g. of capric acid. Agitation at 70°C. was continued for one hour. The slurry was filtered and flash dried. The powder was electrostatically sprayed onto 28 oz. nonreturnable beverage bottles as described in Example 6. Peel adhesion and cullet retention results are set forth in Table 3.

EXAMPLE 19

Example 18 was repeated except that 5 g. of lauric acid (Humko Products' Hystrene 9512) were added per 100 g. of base resin. The lauric acid was neutralized by addition of 40 g. of NaOH per 100 g. of lauric acid. After being filtered and dried the powder was sprayed onto beverage bottles as described in Example 18. Peel adhesion and cullet retention results are set forth in Table 3.

EXAMPLE 20

Example 18 was repeated except that 5 g of a mixture of arachidic and behenic acids (Humko Products' Hystrene 9022) were added per 100 g. of base resin. 25 Grams of NaOH per 100 g. of fatty acid were added for neutralization purposes. Beverage bottles were sprayed as described in Example 18. Peel adhesion and cullet retention results are set forth in Table 3.

EXAMPLE 21

Ionic copolymer powder was prepared as described in Example 6 except that the powder was not neutralized. The wet filter cake from the process was slurried in a stainless steel beaker with distilled water at 75°C. with agitation. Five grams of sodium stearate (Witco T-1, a mixture of sodium stearate and sodium palmitate) were added per 100 g. of base resin. Agitation was continued for 1 hour. The slurry was filtered and dried. The powder was sprayed onto beverage bottles as described in Example 6. Peel adhesion and cullet retention results are set forth in Table 3.

EXAMPLE 22 (Control)

The unneutralized ionic copolymer powder described in Example 21 having no additive present was sprayed onto beverage bottles as described in Example 6. The coating adhered very tightly to the glass bottles and the bottles had very poor cullet retention in the drop test. The results are set forth in Table 3.

TABLE 3

| Example No. | Additive | Additive Percent on Polymer | Cullet Retention Percent Greater Than | | | Peel Adhesion (gms./inch) | |
|---|---|---|---|---|---|---|---|
| | | | 98 | 95 | 90 | 1 Day | 2 Days |
| 18 | Capric Acid | 5 | 92 | 92 | 92 | 128 | 116 |
| 19 | Lauric Acid | 5 | 100 | 100 | 100 | 106 | 50 |
| 20 | Arachidic and Behenic Acids | 5 | 67 | 83 | 100 | 75 | 62 |
| 21 | Sodium Stearate | 5 | 73 | 50 | 50 | 359 | 632 |

TABLE 3-continued

| Example No. | Additive | Additive Percent on Polymer | Cullet Retention Percent Greater Than | | | Peel Adhesion (gms./inch) | |
|---|---|---|---|---|---|---|---|
| | | | 98 | 95 | 90 | 1 Day | 2 Days |
| 22 (Control) | None | — | 0 | 0 | 5 | >3000 | >2500 |

I claim:

1. Powder coating material for glass which consists essentially of a copolymer of α-olefins of the formula R—CH=CH$_2$, where R is a radical selected from the class consisting of hydrogen and alkyl radicals having from 1 to 8 carbon atoms, and α,β-ethylenically unsaturated carboxylic acids having from 3 to 8 carbon atoms, said copolymer having from 0% to 90% of the carboxylic acid groups ionized by neutralization with uncomplexed metal ions, said metal ions having an ionized valence of from one to three inclusive when the unsaturated acid is a monocarboxylic acid and an ionized valence of one when the unsaturated acid is a dicarboxylic acid said copolymer being a copolymer of the α-olefins and the unsaturated carboxylic acid in which the carboxylic acid groups are randomly distributed over all molecules and in which 1. the α-olefin content of the copolymer is at least 50 mol percent, based on the α-olefin-acid copolymer,
2. the unsaturated carboxylic acid content of the copolymer is from 0.2 to 25 mol percent, based on the α-olefin-acid copolymer, and
3. any other monomer component optionally copolymerized in said copolymer is monoethylenically unsaturated, and 1 to 20% by weight, based on the weight of the copolymer, of an additive selected from the class consisting of monobasic fatty acids of 10 to 22 carbon atoms, metal salts of monobasic fatty acids of 10 to 22 carbon atoms, and mixtures thereof.

2. A coating material according to claim 1 wherein the additive is a monobasic fatty acid of 10 to 22 carbon atoms.

3. A coating material according to claim 2 wherein the fatty acid is stearic acid.

4. A coating material according to claim 2 wherein the fatty acid is oleic acid.

5. A coating material according to claim 1 wherein the additive is a salt of a monobasic fatty acid of 10 to 22 carbon atoms.

6. A coating material according to claim 5 wherein the acid salt is the salt of stearic acid.

7. A coating material according to claim 5 wherein the acid salt is the salt of oleic acid.

8. A coating material according to claim 6 wherein the acid salt is an alkali metal stearate.

9. A coating material according to claim 8 wherein the stearic acid salt is sodium stearate.

10. A coating material according to claim 6 wherein the stearic acid salt is zinc stearate.

11. A coating material according to claim 7 wherein the acid salt is an alkali metal oleate.

12. A coating material according to claim 11 wherein the oleic acid salt is sodium oleate.

13. A coating material according to claim 1 wherein the additive is a mixture of monobasic fatty acids of 10 to 22 carbon atoms.

14. A coating material according to claim 13 wherein the additive is a mixture of arachidic and behenic acids.

15. A coating material according to claim 1 wherein the copolymer is an ionic copolymer having from 10 to 90% of the carboxylic acid groups ionized by uncomplexed neutralization with metal ions.

16. A coating material according to claim 15 wherein the metal ions are taken from the group consisting of Na$^+$ and Zn$^{+2}$.

17. A coating material according to claim 15 wherein the copolymer is an ethylene/methacrylic acid ionic copolymer.

18. A coating material according to claim 1 wherein the copolymer is a copolymer of α-olefins of the formula R—CH=CH$_2$, where R is a radical selected from the class consisting of hydrogen and alkyl radicals having from 1 to 8 carbon atoms, and α,β-ethylenically unsaturated carboxylic acids having from 3 to 8 carbon atoms, said copolymer having none of the carboxylic acid groups ionized by neutralization with uncomplexed metal ions.

19. A coating material according to claim 18 wherein the copolymer is ethylene/methacrylic acid.

20. Glass coated with a material according to claim 1.

21. Glass bottles coated with a material according to claim 1.

* * * * *